United States Patent
Gordon et al.

(10) Patent No.: US 6,345,683 B1
(45) Date of Patent: Feb. 12, 2002

(54) SYSTEM AND METHOD FOR AN IMPROVED DEVICE FOR MEASURING WATER LEVELS

(75) Inventors: R. Lee Gordon, San Diego, CA (US); Atle Lohrmann, Olso (NO)

(73) Assignee: Nortek USA, LLC, San Diego, CA (US)

(*) Notice: Subject to any disclaimer, the term of this patent is extended or adjusted under 35 U.S.C. 154(b) by 0 days.

(21) Appl. No.: 09/544,323

(22) Filed: Apr. 6, 2000

(51) Int. Cl.[7] .................................. G01S 15/00
(52) U.S. Cl. ............... 181/124; 73/290 V; 367/908; 340/612
(58) Field of Search ................. 181/102, 103, 181/107, 110, 124; 73/290 V, 290 R, 609, 610, 620, 621, 618, 597, 645, 646; 367/908, 99, 82; 340/612, 618, 621

(56) References Cited

U.S. PATENT DOCUMENTS

| | | |
|---|---|---|
| 2,560,911 A | 7/1951 | Wolf |
| 2,753,542 A | 7/1956 | Rod et al. |
| 2,775,748 A | 12/1956 | Rod et al. |
| 2,787,160 A | 4/1957 | Van Valkenburg |
| 2,869,108 A | 1/1959 | Smith, Jr. |
| 2,883,861 A | 4/1959 | Van Valkenburg et al. |
| 2,998,723 A | 9/1961 | Smith, Jr. et al. |
| 3,010,318 A | 11/1961 | Mongan |
| 3,019,650 A | 2/1962 | Worswick |
| 3,100,885 A | 8/1963 | Welkowitz et al. |
| 3,133,442 A | 5/1964 | Werner |
| 3,394,589 A | 7/1968 | Tomioka |
| 3,693,445 A | 9/1972 | Johnson |
| 3,704,442 A | 11/1972 | Wright |
| 3,978,731 A | 9/1976 | Reeder et al. |
| 3,985,030 A | 10/1976 | Charlton |
| 4,145,914 A | 3/1979 | Newman |
| 4,535,632 A | 8/1985 | Sinha et al. |
| 4,596,144 A | 6/1986 | Panton et al. |
| 4,675,854 A | 6/1987 | Lau |
| 4,700,569 A | 10/1987 | Michalski et al. |
| 4,770,038 A | 9/1988 | Zuckerwar et al. |
| 4,972,386 A | 11/1990 | Lau |
| 5,065,624 A | 11/1991 | Fell |
| 5,335,545 A | 8/1994 | Leszczynski |
| 5,715,890 A | 2/1998 | Nolen |
| 5,760,309 A * | 6/1998 | Maltby et al. ............ 73/290 V |
| 5,768,939 A * | 6/1998 | Quayle et al. ............ 73/290 V |
| 5,856,953 A | 1/1999 | Durkee |
| 5,877,997 A | 3/1999 | Fell |
| 5,914,911 A * | 6/1999 | Babour et al. ................ 367/82 |

* cited by examiner

*Primary Examiner*—Khanh Dang
(74) *Attorney, Agent, or Firm*—Lyon & Lyon LLP

(57) ABSTRACT

A method and apparatus for determining the surface level of a given body using acoustic ranging that incorporates processes natural to human beings to improve identification of the echo from the water surface when spurious echoes might otherwise overshadow it. An acoustic beam is transmitted toward the surface where it is reflected. The beam also reflects off various interferences creating spurious reflections or echoes. The echoes from the surface as well as the spurious echoes are then received. Each echo is then evaluated according to several criteria, in order to determine which echo is associated with the surface. In one embodiment, a set of candidate echoes is identified, the one most likely to represent the surface is selected by using multiple different criteria for evaluating the echo, assigning each criteria a sensible quality factor, computing an overall quality factor by mathematically combining the individual quality factors, and identifying the surface peak as the peak with the highest overall quality factor. In one embodiment, an evaluation technique involves measuring the amplitude, signal to noise ratio, and width of a received echo. In another embodiment, a first echo is compared to subsequent echoes to determine if the subsequent echoes are multiple bounces of the first echo. In still another embodiment, an independent input device, such as a pressure sensor, is used to make a rough measurement of the surface level. In another embodiment, measurement history is used to analyze the received echoes in order to aid in determining which echo corresponds to the surface.

30 Claims, 14 Drawing Sheets

SYSTEM AND METHOD FOR AN IMPROVED DEVICE FOR MEASURING WATER LEVELS

FIELD OF THE INVENTION

The present invention relates generally to determining the surface level of a given body and, more particularly, relates to a method and apparatus for determining the surface level of a given body using acoustic ranging.

BACKGROUND OF THE INVENTION

Using acoustic ranging to find the level of a liquid or solid body is well known to those practiced in the art. The general approach is to transmit a pulse of sound, listen to the echo, compute the time between transmission and reception, and convert this to a distance by multiplying the time by the speed of sound. An example of present capabilities is embodied in the EZQ River Flow Monitor, manufactured by Nortek AS of Oslo, Norway. The EZQ measures stage (surface level) with a vertical echo sounder that finds the strong echo of the water surface. The surface level or depth can be a very important commodity. For example, it can be very important in determining flow rates of water channels, which can be critical knowledge for a variety of reasons. Often, however, multiple echoes are received due to interference with the acoustic signal by debris. Additionally, multiple bounces of the echo where the depth is shallow can create added echoes, as can echoes generated from strong reflectors outside the acoustic beam or due to imperfect beam design. The additional echoes compete with the surface echo and make it hard to determine which echo actually corresponds to the surface. An issue not addressed by conventional systems is the problem of identifying a specific echo to associate with the surface being measured. There are many circumstances in which spurious echoes compete with the surface echo. The problem is to discern between the desired surface echo and any spurious echoes that may exist.

For example, because there is no control over natural water flows, debris within a flow is a rich source of spurious echoes. At the same time, water level at such sites is an important and economically valuable parameter to measure, as it forms a key element in measuring flow rates. Spurious echoes in rivers can come from debris, bubbles, fish, and plants, to name a few. Spurious echoes also arise from obstacles outside of the main acoustic beam due to imperfect beam design or because the obstacles are particularly strong reflectors.

Properly implemented acoustic sensors will find the surface most of the time. But spurious echoes can introduce spikes and dropouts into the measurement. Cleaning up this noisy data requires human intervention, which increases cost and delays the availability of good data. Consequently, the value of the data for use in automated processes and for automated data reporting is limited. With appropriate visual displays, a human being is easily able to discern echoes from the water surface and to filter out spurious echoes. This is because a human being is able to detect patterns and history within the information displayed, can include prior knowledge of measurement results, and can weigh evidence within the real world and within the results obtained. What is needed is an automated apparatus and method that incorporates processes natural to human beings, to improve identification of the surface echo in environments in which it might otherwise be overshadowed by spurious echoes.

SUMMARY OF THE INVENTION

The present invention is directed toward a method and apparatus for determining the surface level of a given body using acoustic ranging. In order to determine the surface level of a given body, whether the body is a solid or a liquid, an acoustic pulse is sent through the body. The pulse bounces off the surface of the particular body being investigated and returns toward the source, thus forming an echo. When the echo arrives back at the source, it is received and processed into data relating the strength of the echo and the roundtrip time from transmission to reception. The time is then converted into a distance by multiplying the time by the speed of sound within the body.

The surface level or depth can be a very important commodity. For example, it can be very important in determining flow rates of water channels, which can be critical knowledge for a variety of reasons. Often, however, multiple echoes are received due to interference with the acoustic signal by debris. Additionally, multiple bounces of the echo where the depth is shallow can create added echoes, as can echoes generated from strong reflectors outside the acoustic beam or due to imperfect beam design. The additional echoes compete with the surface echo and make it hard to determine which echo actually corresponds to the surface. The claimed invention overcomes this problem and enables an instrument to automatically select the echo corresponding to the surface reflection.

As such, a method for determining the surface level of a given body using acoustic ranging is presented. First, an acoustic pulse is transmitted through the liquid or solid body. In one embodiment, an electric signal is converted into an acoustic pulse, which is transmitted in an upward direction through the solid or liquid. The acoustic pulse travels vertically toward the surface where it is reflected. Any debris within the path of the pulse, as well as strong reflectors outside the path, may also reflect the acoustic pulse. For example, if the body is a liquid body in a channel, the pulse may reflect off silt, or other debris traveling in the channel. Additionally, imperfect beam design may allow generation of spurious echoes and, in shallow bodies, the echo may bounce up and down multiple times creating multiple spurious echoes.

As a result, the echo from the surface as well as spurious echoes is received. In one embodiment, the surface echo and multiple spurious echoes are converted into electric receive signals. The received signals are then filtered and processed for analysis and display to a user. The processed signals are then evaluated by locating peaks within the data, which represent strong echoes that may correlate to the surface echo. The peaks are then evaluated according to a variety of criteria to arrive at a measurement of the quality of each peak. The higher the quality, the more likely the peak represents the surface echo, as opposed to a strong spurious echo. Finally, the peak with the highest quality measurement is determined to represent the surface echo and the roundtrip time associated with the peak is converted to a distance representing the depth of the body.

In one embodiment, the evaluation criteria involves measuring the amplitude of the received echo, in order to determine the echo's signal strength, measuring the signal to noise ratio of the echo, and measuring the width of the received echo. These measurements are then converted into a quality measurement for the echo. The higher the quality measurement, the more likely the echo corresponds to the surface. Sometimes, however, the surface echo may be weaker than a particularly strong spurious echo or echoes, or the surface echo may not be present at all. Therefore, additional evaluation criteria may be required to select the correct echo or to enable ignoring a particular echo.

For example, in one embodiment, a first echo is looked at in relation to subsequent echoes to determine if the subsequent echoes are multiple bounces of the first echo. This can occur when the depth of the body is relatively shallow. The transmitted acoustic pulse will bounce off the surface and return to the source with relatively strong signal strength. When it arrives back at the source, it is reflected back toward the surface and the process starts over. The result of this phenomenon is the reception of several echoes evenly spaced in time. By looking at the time relationship of subsequent echoes with respect to a first echo, it can be determined if the subsequent echoes are multiple bounces of the first. The subsequent echoes that appear to be multiple bounces of a first echo can then be given lower quality measurements to account for this likelihood.

In one embodiment, an independent input device is used to supply a rough estimate of the surface level. Received echoes are then evaluated for how closely they correspond to the measurement provided by the independent input. For example, in one implementation used to determine the surface level of a liquid body, a pressure sensor can be used to perform the independent measurement. In another implementation, a human being enters the approximate water level manually. Echoes that are relatively close to the measurement provided by the pressure sensor are then afforded a higher quality measurement, as they are more likely to be the surface echo.

In another embodiment, various data are combined mathematically in order to provide a better first estimate of the surface location, as opposed to the rough estimate provided by a pressure sensor alone, in situations where water level moves up and down as a result of surface waves. In such cases, instantaneous pressure consists of a mean pressure signal plus a varying pressure signal that varies at the frequency of the waves. Waves introduce errors associated with the fact that the varying pressure signal attenuates with depth. A better first estimate of the instantaneous water level can, in such cases, be obtained with a mathematical equation that combines parameters such as the mean and varying pressure signal and its time derivative, and the vertical velocity and its time and depth derivatives.

In another embodiment, a distribution is generated from historical data comprising measurements of the surface level. In one implementation, the distribution is weighted in favor of more recent history. Echoes that fall within a high distribution are then afforded a higher quality measurement than those that fall within lower distributions.

There is also provided an apparatus for determining a surface level of a given body using acoustic ranging. The device comprises a transducer for transmitting acoustic signals and receiving echoes of transmitted acoustic signals, and transmit electronics for applying an electric signal to the transducer. In one embodiment, the transducer converts the electric signal into the acoustic transmission. The device also includes receive electronics, wherein the transducer converts the acoustic echoes into electric signals and the receive electronics filter and condition the electric signals for analysis. A processor is also included for computing and digitizing the electric signals. Additionally, an independent measuring device is included for measuring the surface level of the body. In one implementation, the independent measuring device is a pressure sensor.

There is also provided a device for determining a surface level of a given body using acoustic ranging, comprising a storage means for storing firmware that is used to run the device and for storing data that is collected by the device. The device also comprises an input/output interface for uploading the firmware from a personal computer or the like, and for downloading the collected data to a personal computer or external storage device. A transducer is also included for transmitting acoustic signals and receiving echoes of transmitted acoustic signals. Additionally, a pressure sensor is included for performing independent measurements of the surface level. The device also comprises a processor for controlling the operation of the device, including the operation of the transducer, the pressure sensor, the input/output interface, and the storing of the collected data. The processor controls the device operation by running the firmware stored in the storage means. Finally, a power supply is included that interfaces to and conditions the voltage supplied by batteries used to power the device.

BRIEF DESCRIPTION OF THE DRAWINGS

The present invention is described with reference to the accompanying drawings. In the drawings, like reference numbers indicate identical or functionally similar elements.

DETAILED DESCRIPTION OF PREFERRED EMBODIMENTS

1. Example Environment

Figure 1:
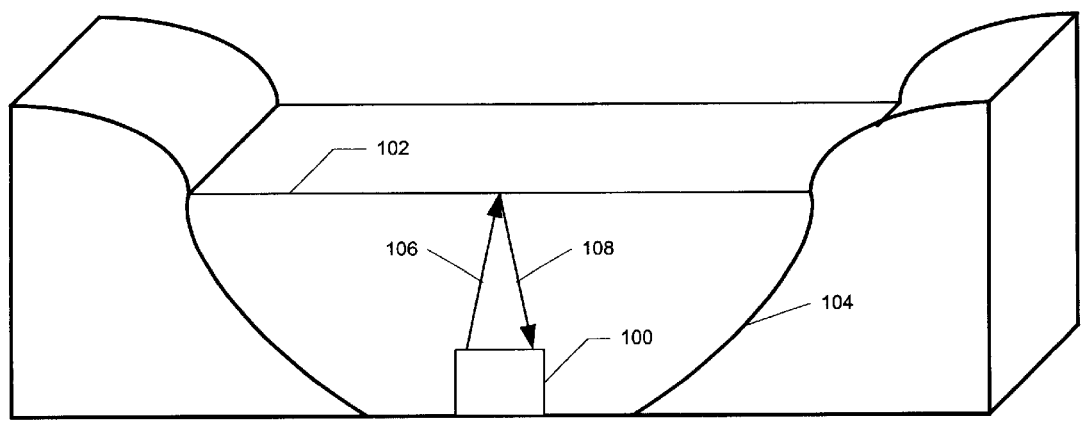
FIG. 1 is a diagram illustrating how a device could be used in accordance with the claimed invention.

FIG. 1 illustrates a cross sectional view of a channel 104 containing a flow of water 102 and represents an example environment for the claimed invention. A surface level measurement of liquid in a channel, such as channel 104, is a key parameter in measuring the flow rate of the liquid. The flow rate and volume flow rate can be economically valuable data to possess. For example, in the western region of the nation, multiple counties and states are forced to share relatively few water sources. These water sources include rivers for which accurate flow rate calculations can prove invaluable in effectively allocating water between competing counties or states. Alternatively, flow rate measurements can be used to control automated sampling systems and can be used to control other flow proportional applications. For example, U.S. Pat. No. 4,145,915 to Newman discloses the use of flow measurements to control a wastewater sampling system.

Referring back to FIG. 1, a traditional device 100 used for measuring the depth of flow 102 is equipped with a transmitter capable of transmitting an acoustic pulse 106. Device 100 is also equipped with a receiver for receiving an echo 108, which is generated when pulse 106 reflects off the surface of flow 102. Traditional devices often combine the transmitter and receiver into one transducer. The surface level is determined by calculating the roundtrip time from transmission of pulse 106 to reception of echo 108, then converting this time to a distance by multiplying the time by the speed of sound in the liquid. As can be seen, converting the roundtrip time to a distance does not directly result in the surface level. This is because the roundtrip time includes the time it took acoustic pulse 106 to travel up to the surface, as well as the time for echo 108 to travel back down. Because pulse 106 and echo 108 will travel through the liquid at the same speed and cover the same distance, the surface level can easily be obtained by dividing the overall distance in half.

Figure 2:
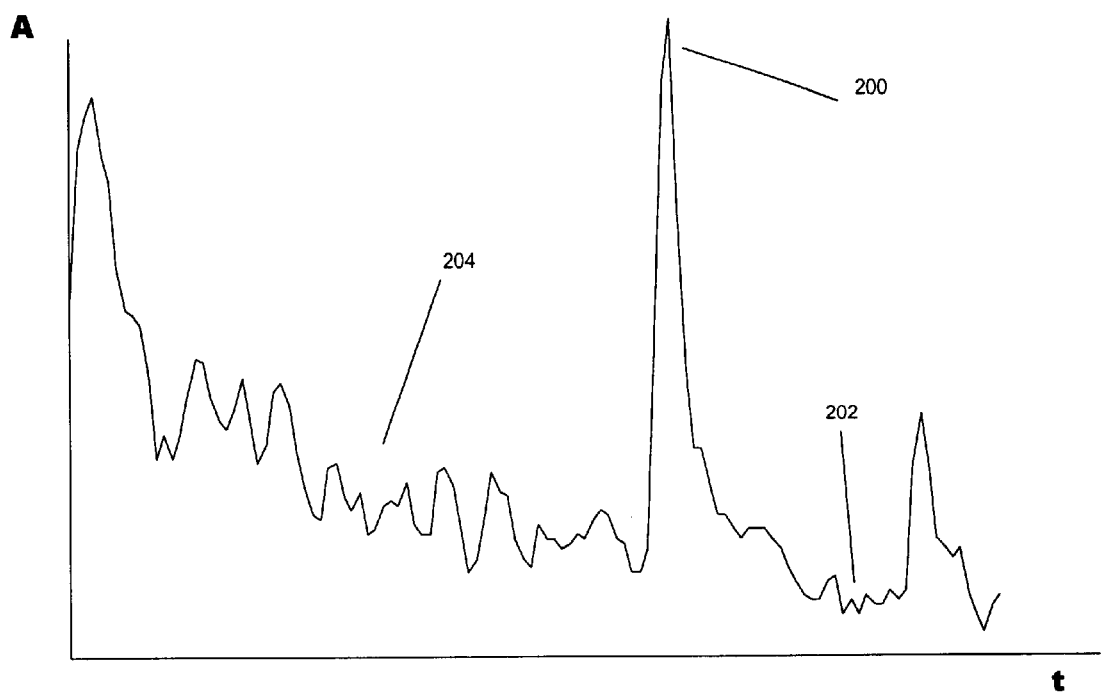
FIG. 2 is a diagram illustrating a peak representing the amplitude and time of a received echo in accordance with the claimed invention.

The received data is typically converted into a curve relating the amplitude (A) of the received echo against the time (t) the echo was received. A graph of such a relationship is illustrated in FIG. 2. An echo from a strong reflector, such as the surface, will appear as a pulse 200 with amplitude that is well above the general noise level 202 in the receiver. The general background noise level of the receiver will vary with time, as seen by comparing 204 with 202. The variations with time are caused by range-dependent signal attenuation and by time-dependent electronics system response. If the system illustrated in FIG. 1 is properly implemented, it will detect the surface a significant fraction of the time. Because there is no control over natural flows, however, there are many circumstances in which spurious echoes will compete with the desired surface echo.

In a river, for example, debris, fish, bubbles, and plants are all sources of spurious echoes. Spurious echoes also arise from obstacles outside the path of the acoustic pulse (referred to as the beam), if they are particularly strong reflectors, or due to improper beam design. In an environment in which there exist multiple strong reflectors, the graph of the received data may appear more like the one illustrated in FIG. 3, in which it can be seen that there are several strong pulses 300, 302 and 304. Simple algorithms for selecting the pulse associated with the true water surface may select the wrong pulse. Cleaning up the resulting noisy data would traditionally require human intervention. Unfortunately, human intervention increases the cost and delays the availability of the data desired. In systems that use the flow measurement in automated processes or for automated data reporting, the usefulness is severely limited if human intervention is required.

2. Preferred Embodiment

Figure 6:
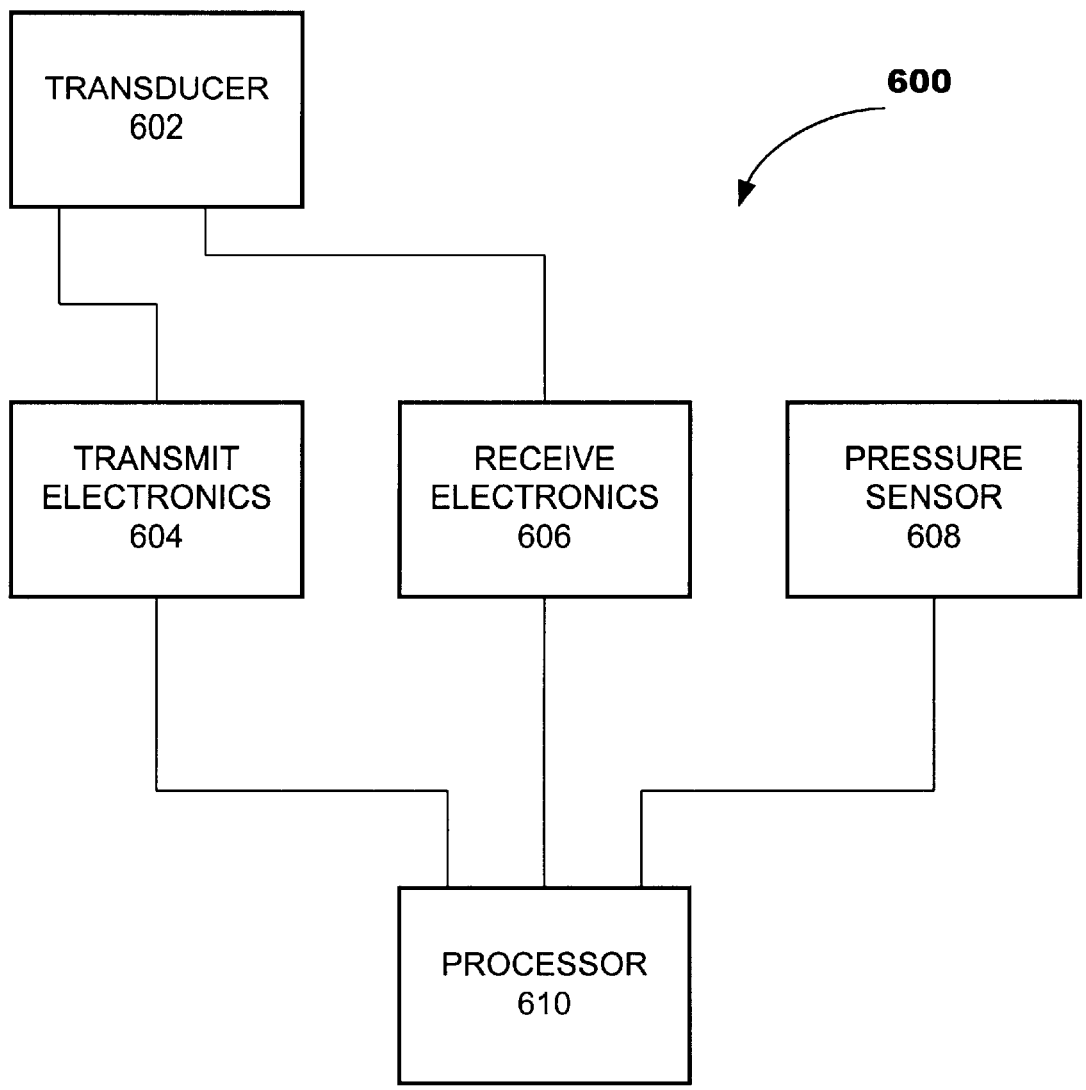
FIG. 6 is a block diagram illustrating the logical components of a device used to determine the surface level of a given body in accordance with the claimed invention.

FIG. 6 is a block diagram illustrating the functional components comprising a first embodiment of the claimed invention. This logical grouping is provided for discussion purposes only and should not be interpreted to require a specific physical architecture. Referring now to FIG. 6, a device 600 for measuring the surface level of a given body is illustrated. Device 600 comprises a transducer 602, transmit electronics 604, receive electronics 606, and a processor 610.

Transmit electronics 604 drive the transducer with electronic signals when a measurement is required. In one example implementation, processor 610 enables transmit electronics 604 when a measurement is required and transmit electronics 604 correspondingly drive transducer 602 with an electric signal. In this implementation, processor 610 may be running a software application that determines when a measurement is required. Alternatively, a second implementation uses a simple timer to control when transmit electronics 604 are enabled and an electric drive signal applied to transducer 602. Whenever an electronic signal is applied, transducer 602 converts the signal to an acoustic pulse and transmits the pulse in a vertical direction toward the surface.

Transducer 602 also receives acoustic echoes that have bounced off of reflectors within beam 106. Transducer 602 converts the received echoes into electric signals that can be processed for use in determining the surface level. Receive electronics 606 receive the electric signals from transducer 602. In one example implementation, receive electronics 606 consist of filters to eliminate spurious noise. In a second implementation, amplifiers are included to increase the signal level of the electric receive signals to a sufficient level for further processing. In another example implementation, processor 610 takes the conditioned electric signals from receive electronics 606 and further processes them by digitizing the signals and converting the data to a format that can be displayed. The plot in FIG. 2 illustrates one such format.

Figure 3:
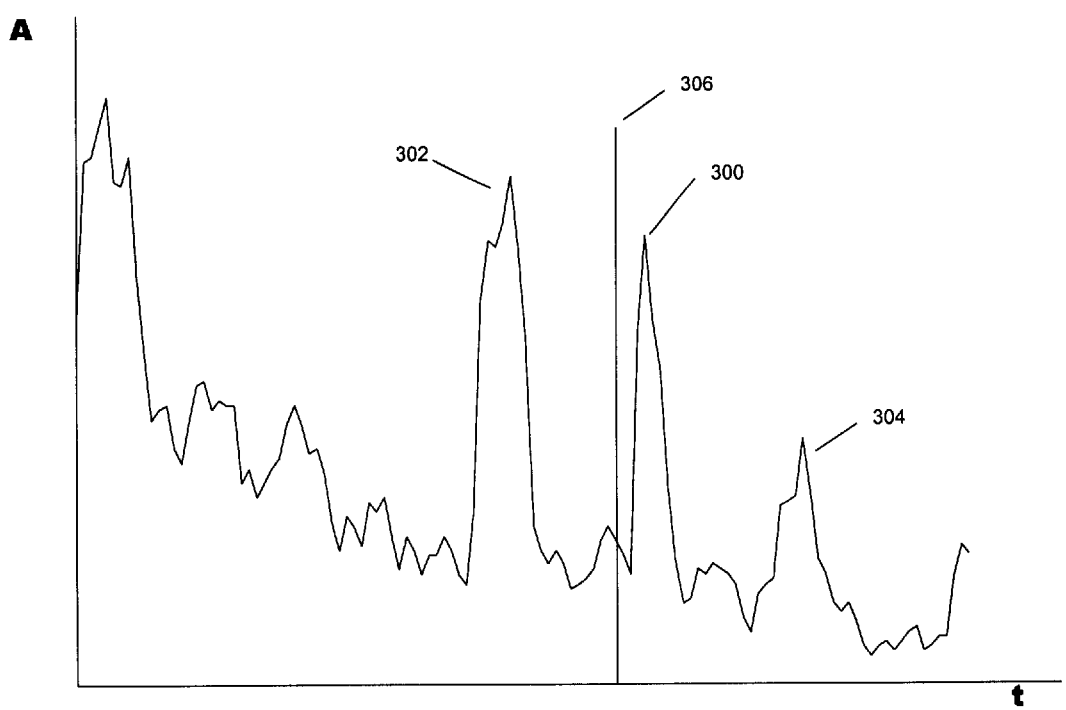
FIG. 3 is a diagram illustrating multiple peaks and the use of an approximate measurement from an independent input device in accordance with the claimed invention.
Figure 7:
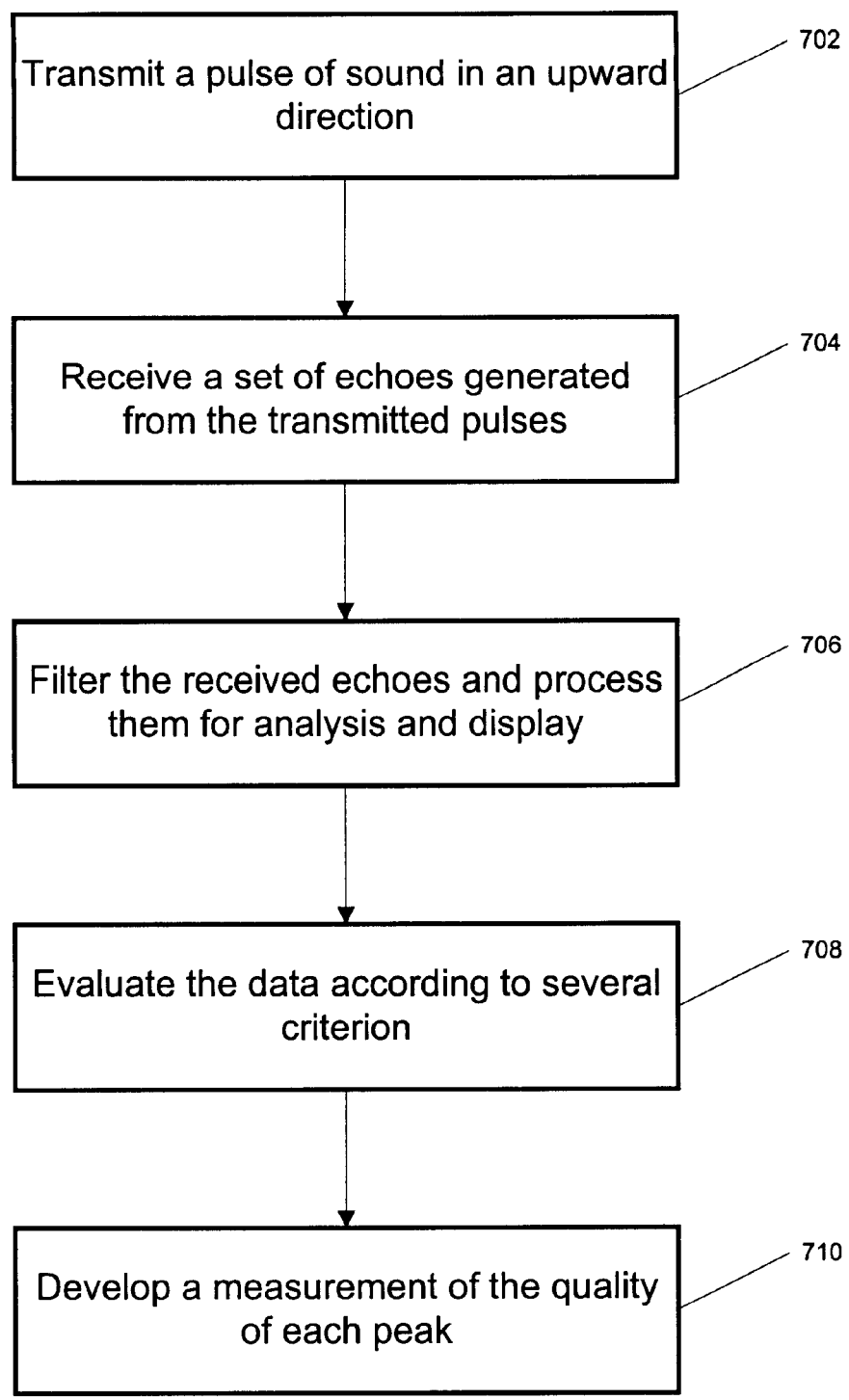
FIG. 7 is a flow diagram illustrating a method of determining the surface level of a given body in accordance with the claimed invention.

Unfortunately, the data will often look like that depicted in FIG. 3, as opposed to the clean data depicted in FIG. 2. In this case, extra steps are required to clean up the data and determine which peak 300, 302, and 304 represents the surface. FIG. 7 is a process flow diagram illustrating one embodiment of a process for determining which peak among competing peaks 300, 302, and 304 represents the peak associated with the surface level. In step 702, an acoustic pulse is transmitted in an upward direction. For example, transducer 602 in a device 100 transmits an acoustic pulse 106 toward the surface of flow 102. In step 704, echoes generated from reflectors within the path of the transmitted pulse are received. Echoes may also be generated from objects outside the acoustic transmit path, if they are particularly strong reflectors or due to improper acoustic beam design. For example, a transducer 602 in a device 100 receives echoes 108 from the surface of flow 102. Any strong reflectors within the path of the transmitted acoustic pulse 106 will also generate echoes 108.

In step 706, the received echoes are filtered and processed for analysis. For example, receive electronics 606 and processor 610 will filter, amplify, digitize, and convert the data as required to generate data in the format shown in FIG. 3. As explained and as shown in step 708, this data will need to be further evaluated according to several criteria, in order to determine which peak 300, 302, and 304 is the desired peak.

Figure 8:
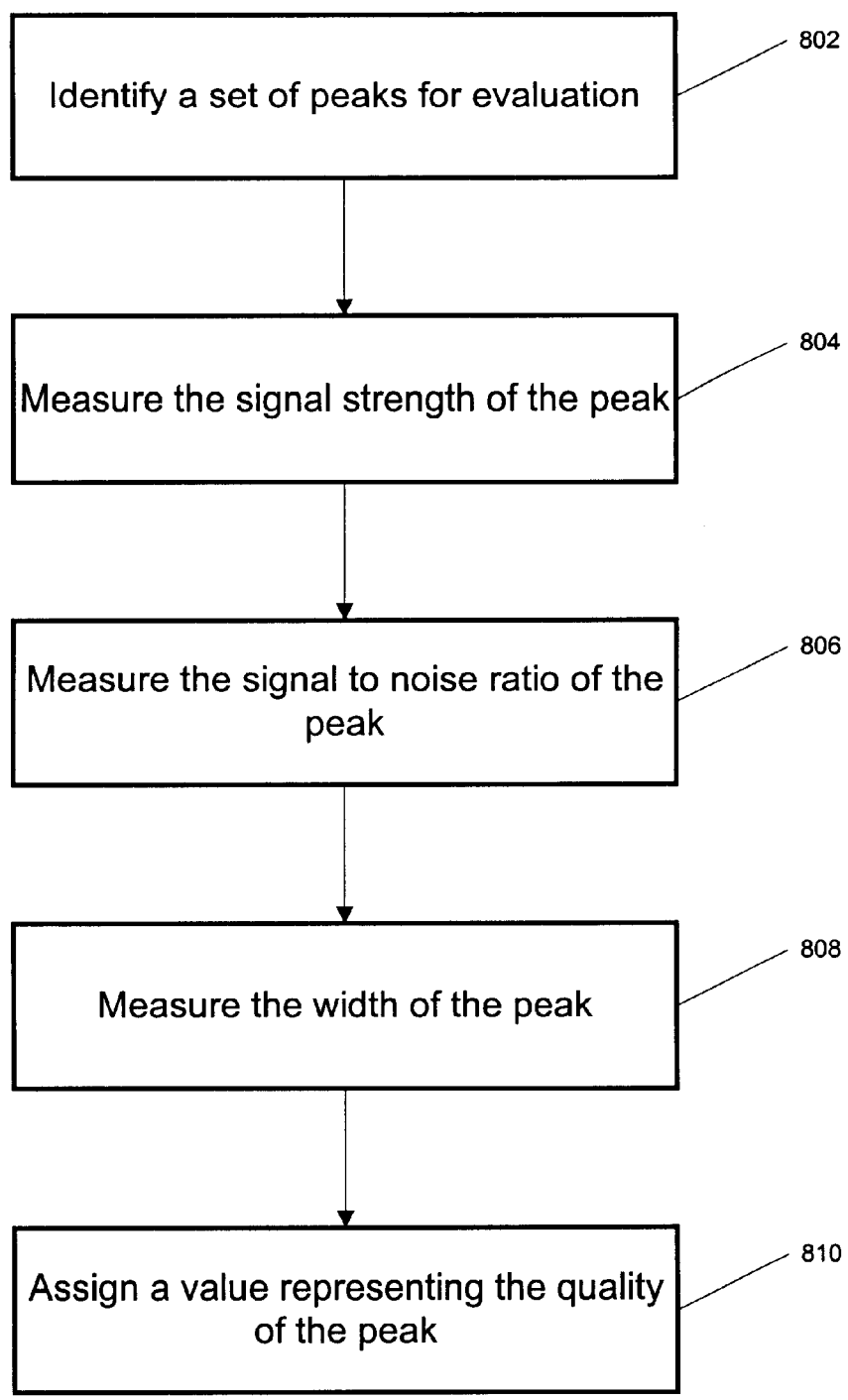
FIG. 8 is a flow diagram illustrating a process of evaluating received data in accordance with the claimed invention.

FIG. 8 illustrates an example process for evaluating a set of peaks according to one sample implementation. In step 802, a set of peaks, such as for example peaks 300, 302, and 304, are identified for analysis. Then, as shown in step 804, the signal strength or amplitude of each peak is measured. In step 806, the signal to noise ratio for each peak is measured. Measuring the signal to noise ratio involves first determining a noise level 202 and 204. Next, the amplitude of the peak as determined in step 804 is divided by the amplitude of noise level 202, to arrive at a ratio of the relative strengths of the signal and noise. This ratio is known as the signal to noise ratio and relates the relative signal strength of a given peak. In step 808, the width of each peak 300, 302, and 304 is measured.

Each of the three measurements in steps 804, 806 and 808 are different in character, and each has a different relative importance. Therefore, quality criteria that reflect the nature of each measurement must be defined. For example, one would expect the surface echo to be generally strong, so quality values can be assigned that increases with echo strength. The same would also apply to signal-to-noise ratio, but one may choose to vary the quality value assigned to a specific signal-to-noise ratio according to how far the pulse is from the instrument. Furthermore, one may choose to weight the quality values associated with signal-to-noise ratio and absolute echo strength differently. A clean echo from the surface will often be narrower than an echo from debris floating in the water. This means that narrow peaks will likely be assigned higher quality values than broad peaks. Thus, a quality value associated with each measurement is arrived at, which is weighted according to how well each measurement enables one to differentiate surface echoes from spurious echoes. The values for each measurement are then added to form an overall quality assessment. The peak with the highest total or quality measurement is then determined to be the peak corresponding to the surface level.

It should be noted that the peaks with the highest measurements in steps 802, 804, and 806 are not necessarily assigned the highest quality values. For example, it may be determined that reflectors between device 100 and the surface generate the largest amplitudes. Therefore, it may be assumed that amplitudes above a certain threshold correspond to spurious echoes and are assigned lower quality values. In general, however, the surface is a very good reflector and the peak corresponding to the surface will measure very high in steps 802, 804, and 806, so that higher measurements will be assigned higher quality values.

Figure 9:
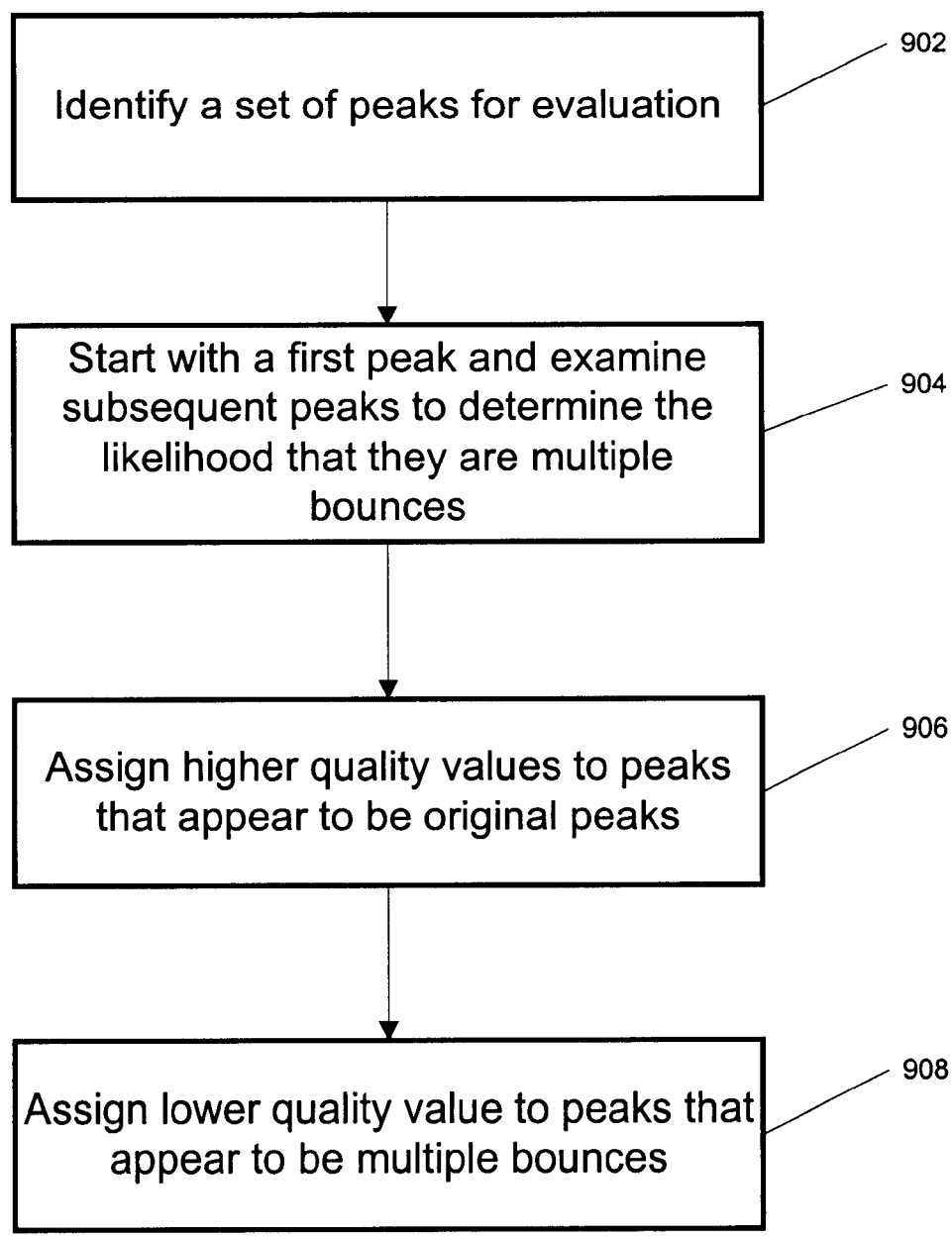
FIG. 9 is a flow diagram illustrating a process of evaluating received data in accordance with the claimed invention.

The process illustrated in FIG. 8 may not be enough, however, to determine the correct peak. Therefore, alternative embodiments use alternative processes either in place of, or in combination with, the process illustrated in FIG. 8. One such process is illustrated in the process flow diagram of FIG. 9. In FIG. 9, step 902 begins by identifying a set of peaks for analysis. In step 904, a first peak is selected and subsequent peaks are examined to determine if they could be multiple bounces of the first peak. Multiple bounces typically occur when the depth of the body being investigated is shallow. In this case, echoes 108 returning toward device 100 will have very strong signal strength. As a result, echo 108 will reflect back toward the surface, which will re-reflect the echo back toward device 100. As a result, transducer 602 will receive a second echo from the same transmit pulse 106. In this manner, transducer 602 will receive several echoes from the same transmit pulse and each echo will be separated in time by an equal amount, i.e. the roundtrip time from device 100 to the surface and back.

Figure 4:
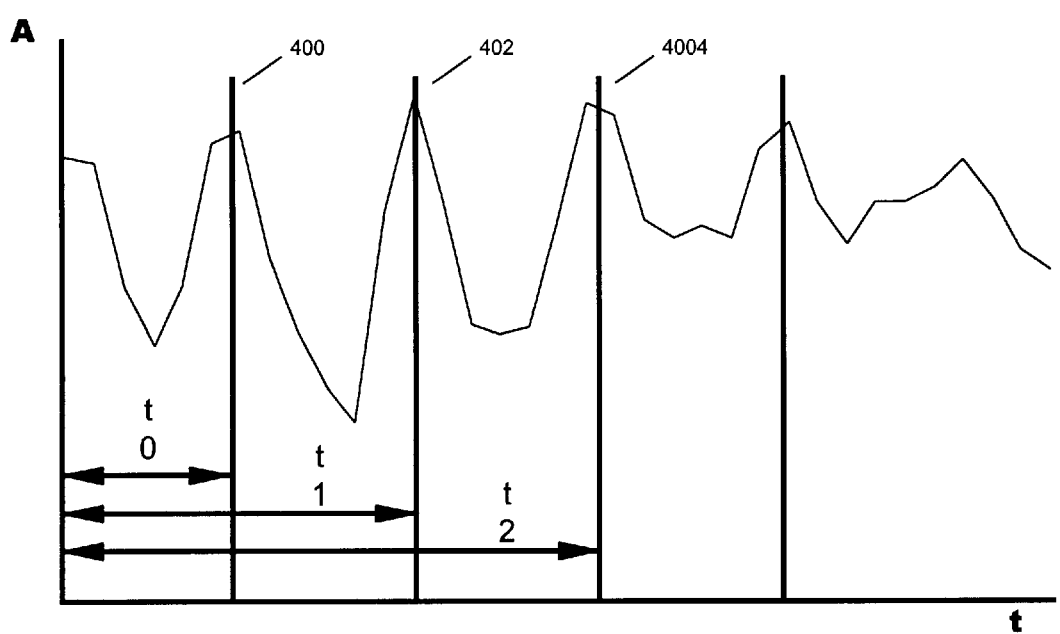
FIG. 4 is a diagram illustrating multiple bounces of the same echo in accordance with the claimed invention.

The plot shown in FIG. 4 further illustrates the multiple bounce phenomena. In FIG. 4, a set of peaks 400, 402, and 404 is identified. Peaks 402 and 404 are then evaluated in relation to peak 400 to determine if they are multiple bounces of peak 400. This is accomplished by examining the time (t0) when peak 400 is received in relation to the time (t1) when peak 402 was received. If time (t1) is double the value of time (t0), then there is a likelihood that peak 402 is a second bounce of peak 400. Similarly if time (t2) is three times the value of time (t0), then peak could be a third bounce of peak 400. Once the times (t0, t1, and t2) are analyzed, the quality value can be adjusted accordingly. Referring to FIG. 9, in step 906 higher quality values are assigned to peaks that appear to be original peaks. In step 908, peaks that appear to be multiple bounces, such as peaks 402 and 404, are assigned lower quality values, or even negative values.

Figure 10:
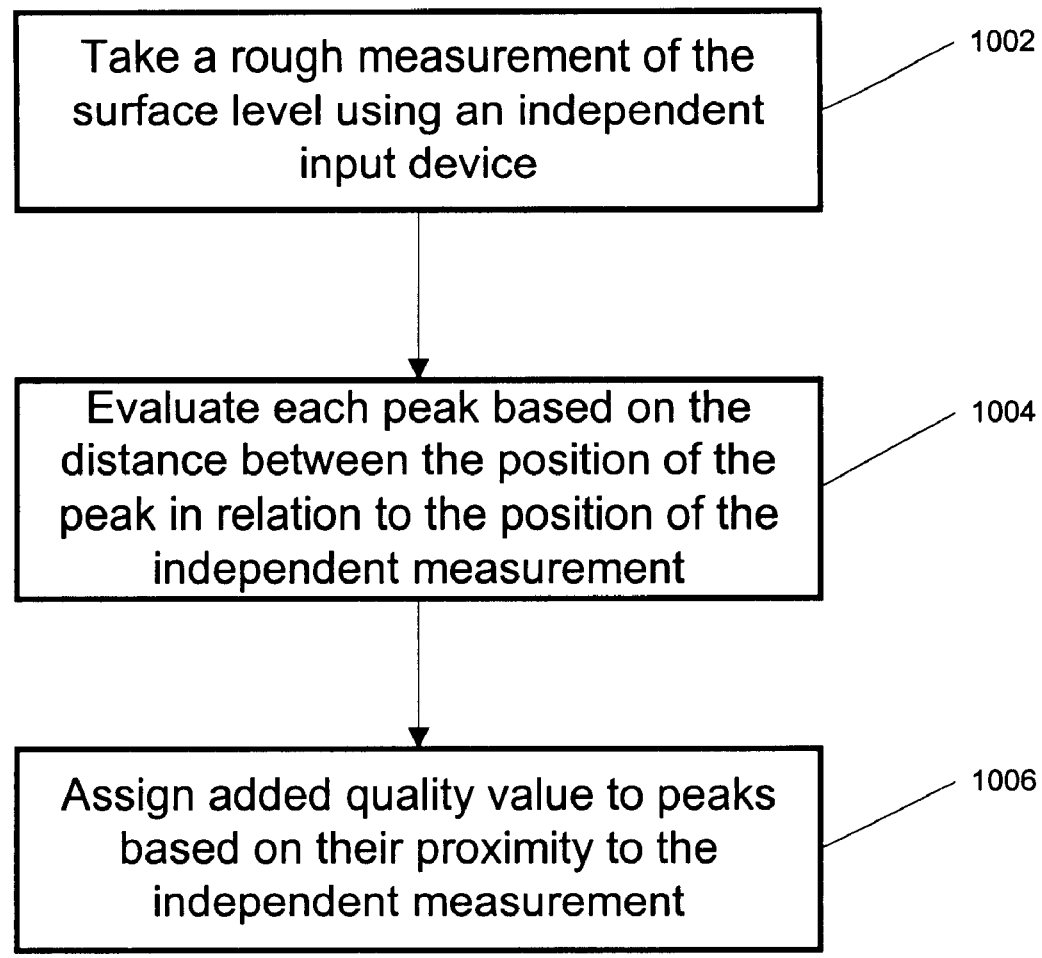
FIG. 10 is a flow diagram illustrating a process of evaluating received data in accordance with the claimed invention.

Still other implementations use alternative methods of evaluating a set of peaks in place of or in addition to the evaluation methods illustrated in FIG. 8 and FIG. 9. An alternative process is illustrated in the process flow diagram of FIG. 10. In step 1002, a rough measurement of the surface level is made using an independent input device. As illustrated in FIG. 6, one implementation of device 600 uses a pressure sensor 608 as an independent input device for making a rough measurement of the surface level. Alternatively, a user may input a rough estimate manually to be used in the evaluation. In step 1004, the measurement obtained via pressure sensor 608 is then compared to the measurements associated with each peak. Referring back to FIG. 3, for example, each peak 300, 302, and 304 is evaluated in relation to pressure sensor measurement 306. Then in step 1006, added quality value is afforded to peaks based on how close they are to the independent measurement 306.

Figure 5:
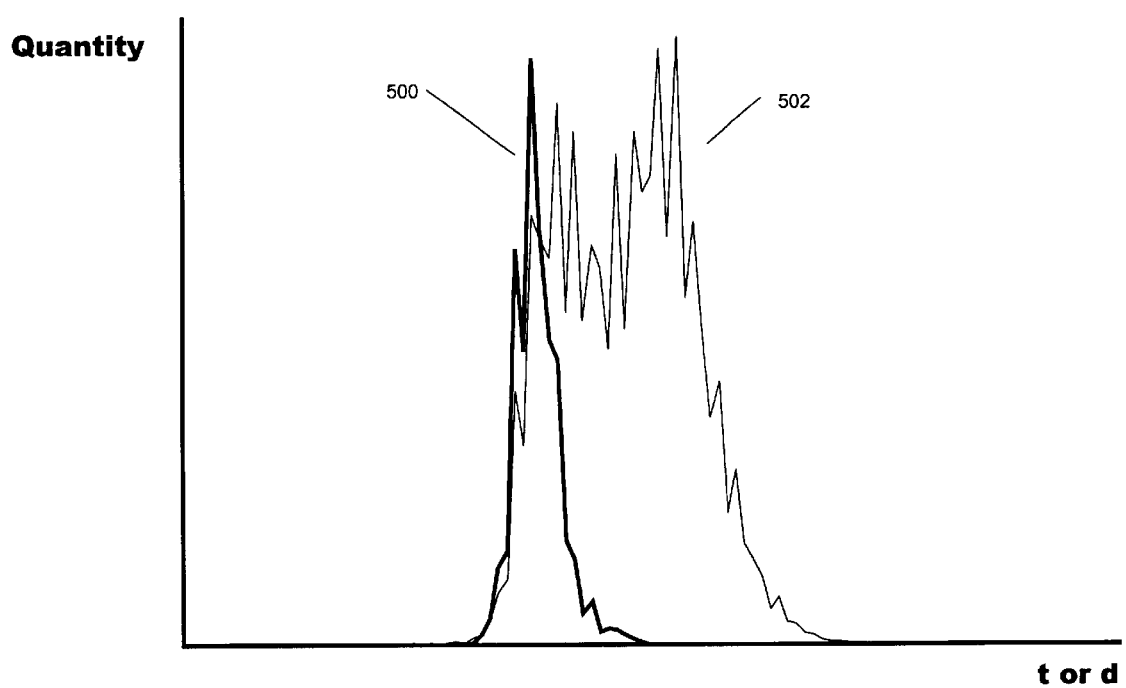
FIG. 5 is a diagram illustrating an historical distribution in accordance with the claimed invention.
Figure 11:
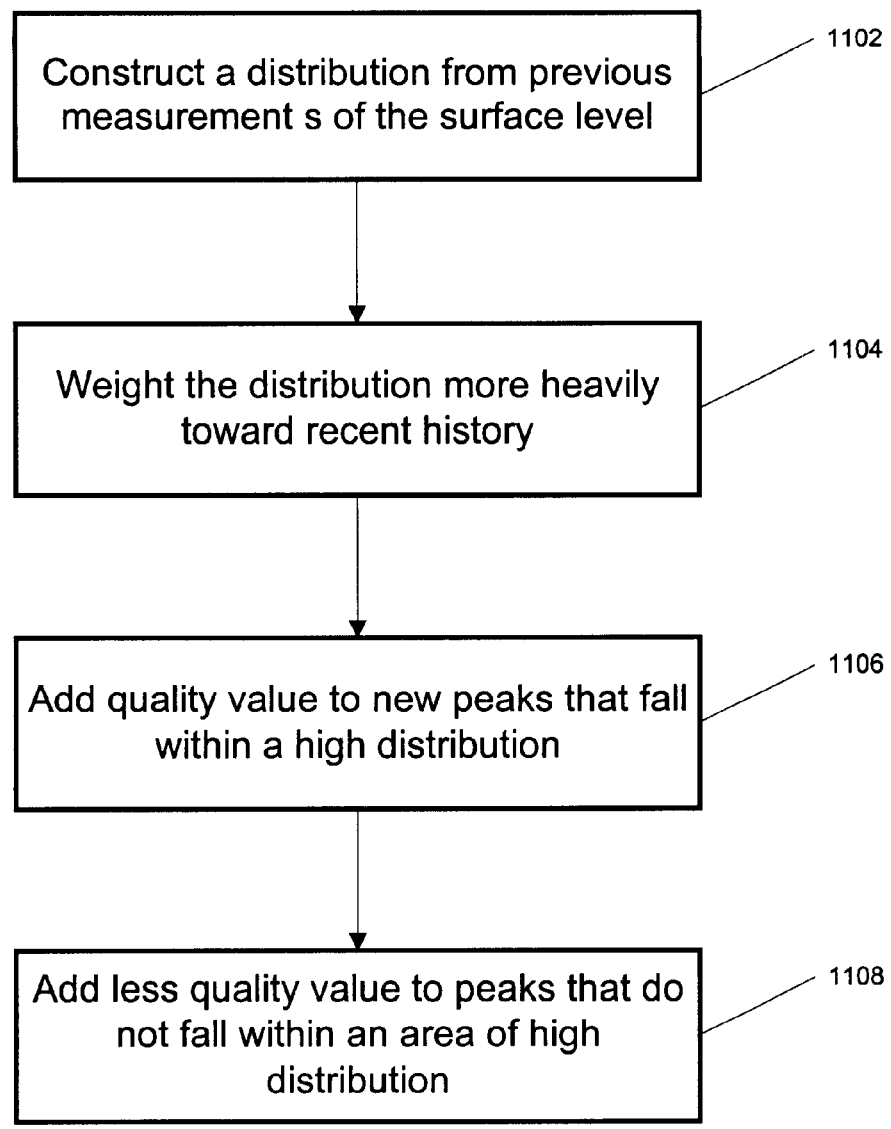
FIG. 11 is a flow diagram illustrating a process of using historical data to determine the peak that correctly corresponds to an echo from the surface in accordance with the claimed invention.

Now referring back to FIG. 7, in step 710 a quality measurement for each peak is arrived at based on the evaluation processes used in step 708. In one implementation, the peak with the highest quality value is determined to be the peak corresponding to the surface echo. In another implementation, each peak is first evaluated against historical data to arrive at a final quality value. FIG. 11 illustrates a sample process flow for evaluating the peaks in light of historical data. The historical data may, for example, take the form of a distribution 500 or 502, such as the ones illustrated in FIG. 5, which are constructed (step 1102) based on previous surface level measurements. The distributions in FIG. 5 plot the number of previous measurements against the measured times (t) or distances (d) arrived at for the surface level. Distribution 500 might represent the most recent period, while distribution 502 represents a larger period extending further into the past.

In step 1104, the distribution is weighted more heavily toward recent history. This may be accomplished, for example, by limiting the distribution to include only recent times, or by giving recent measurements greater weighting than older measurements. In step 1106, quality value can then be added to peaks that fall within a high distribution area of curve 500 and, in step 1108, peaks that fall in areas of low distribution are afforded lower quality value.

In one implementation, external inputs such as the pressure sensor are productively combined with analyses of time history. Pressure sensors generally tend to be rough estimators of water level because they feel the pressure of the atmosphere (which varies substantially over time), they drift, and the mean density of the water above the pressure sensor can vary with time. Because all of these factors tend to vary slowly with time, one may keep track of the history of the difference between the pressure reading and the computed water level, and combine this tracking with the time history. It should also be noted that a time history or average value of the surface level measurements, such as histories 500 and 502 in FIG. 5, will likely serve as the desired result, as opposed to a discrete measurement at any particular time. Further, the process illustrated in FIG. 7 and described above may conclude that none of the peaks in an identified set under analysis correspond to the water surface. In this case, none of the peaks will be included in the overall measurement or average and a new set of peaks will be evaluated.

Therefore, the process flow in FIG. 7 illustrates a method by which a desired echo can be selected from among a set of competing echoes. The method can use a variety of methods for evaluating the peaks in order to determine which peak is the correct one. The evaluation methods can be used in conjunction with, or in alternative to, each other depending on the implementation.

The exact methods or set of methods and the algorithms used by each method will gain from optimization for different environments. For example, water with considerable debris will benefit from a different strategy, as compared to a stream with a lot of weeds growing near the transducer. Differing strategies are implemented by weighing the evidence differently. As in, for example, affording less weight to a peak with amplitude above a certain threshold, under the assumption that such a peak is the result of a reflection from objects near to the transducer. Experience at certain sites will also provide a basis for developing improved strategies.

For example, it may be necessary to combine various data mathematically in order to provide a better first estimate of the surface location, as opposed to the rough estimate provided by a pressure sensor alone, in situations where water level moves up and down as a result of surface waves. In such cases, instantaneous pressure consists of a mean pressure signal plus a varying pressure signal that varies at the frequency of the waves. Waves introduce errors associated with the fact that the varying pressure signal attenuates with depth. A better first estimate of the instantaneous water level can, in such cases, be obtained with a mathematical equation that combines parameters such as the mean and varying pressure signal and its time derivative, and the vertical velocity and its time and depth derivatives. Further, one implementation requires the taking of averages of more than one estimate of water level. Averaging, for example, will be useful for obtaining an accurate mean water level when the surface is wavy. In these cases, the quality factor will serve as a means of rejecting entire echoes if none of the peaks meet a minimum quality factor. Then, the average will be composed of water level measurements obtained only where the quality is above a given threshold.

3. Sample Implementation

Figure 13A:
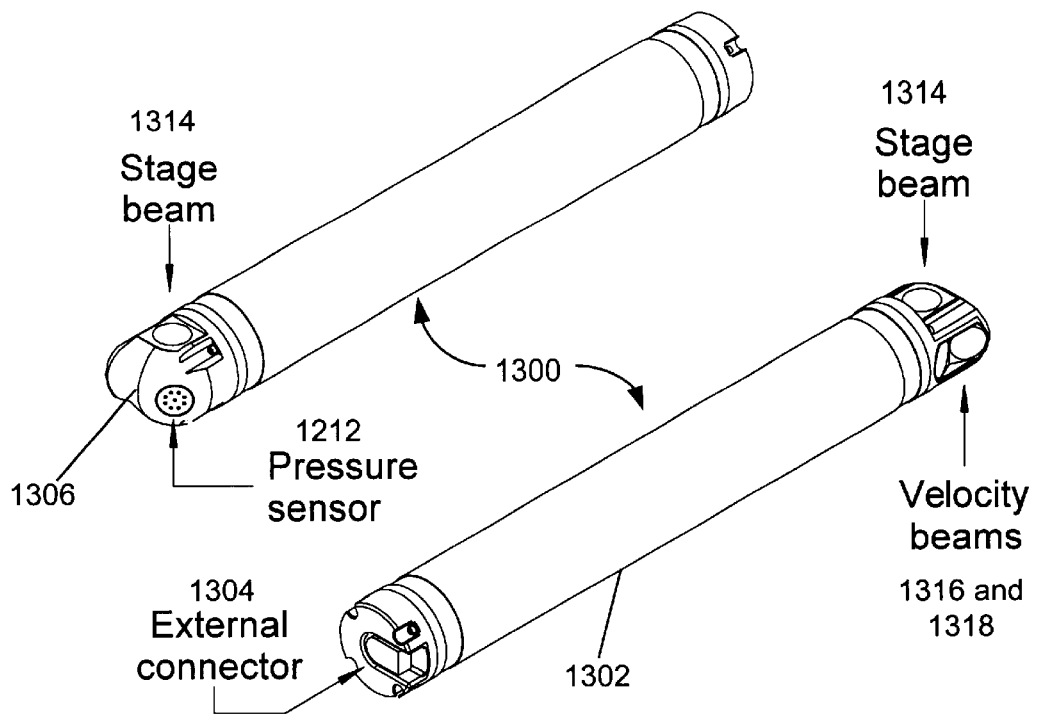
FIG. 13A is a diagram illustrating a sample device in accordance with the claimed invention.

Device 1300 in FIG. 13A illustrates a sample implementation for the claimed invention. Device 1300 is used in liquid bodies and comprises a data Input/Output (I/O) connector 1304 for interfacing with external devices to download data from device 1300 and uploading software to device 1300. Device 1300 also includes a main section 1302, which houses the device electronics and the batteries used to power device 1300. Device 1300 also includes a sensor section 1306 that houses a plurality of echo sensors for measuring parameters such as surface level (or stage) and flow velocity.

Figure 12:
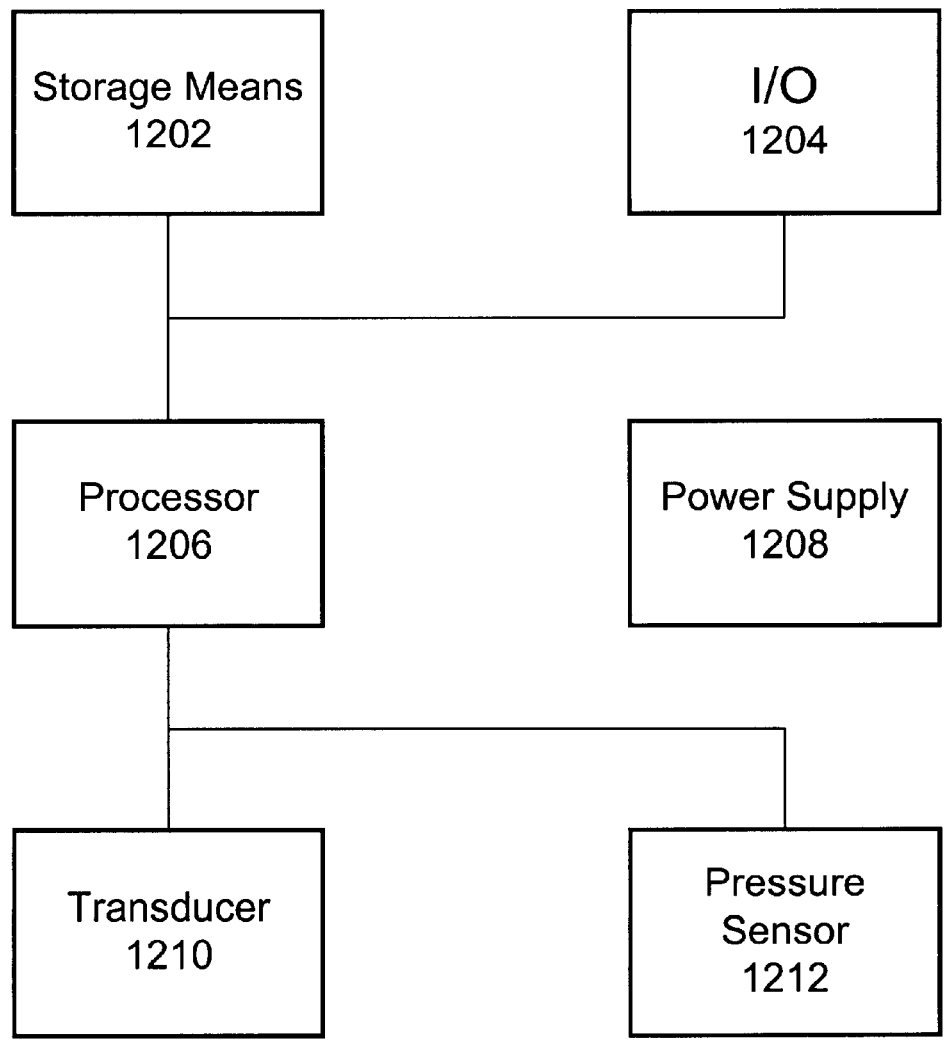
FIG. 12 is a block diagram illustrating the logical components of a sample device in accordance with the claimed invention.

In FIG. 12, a block diagram illustrating the logical components comprising device 1300 is presented. The components consists of I/O interface 1204, storage means 1202, processor 1206, power supply 1208, transducer 1210, and pressure sensor 1212. In the sample implementation illustrated in FIG. 12 and FIG. 13A, I/O interface 1204 is a serial interface and implements an RS232 protocol operating at 9600 Baud. Other implementations are capable of multiple I/O configurations including parallel communication, varying baud rates, and alternative protocols.

I/O interface 1204 is used to set up the instrument. This is accomplished by interfacing with a desktop computer (not shown) via interface 1204 and connector 1304. Firmware comprising setup and application instructions are downloaded from the desktop computer to device 1300. Device 1300 also includes a storage means 1202 that is used to store the firmware and that can be accessed by processor 1206. Storage means 1202 can be a stand-alone memory device such as a flash memory, EPROM or EEPROM, or SRAM, depending on the storage requirements. Alternatively, storage means 1202 can be integrated onto a single chip that includes processor 1206. After reading this specification, it will be apparent to those skilled in the art how to implement these alternative configurations for storage means 1202.

In the example illustrated in FIG. 12, storage means 1202 has a capacity of 2MB and can be extended to 78 MB as required. This is an important feature because in addition to storing the firmware, storage means 1202 is used to store the data collected by the device. Therefore, the amount of data to be collected will directly impact the amount of storage required. Storage means 1202 operates in two modes. In the first, data collection will stop when storage means 1202 is full. The data can then be downloaded via interface 1204 to an external device, such as a desktop computer for analysis. In the second mode, device 1300 will backup the most recent data when storage means 1202 is full and continue to record data. This requires that device 1300 be interfaced as data is being collected to an external storage device such as a desktop computer.

Figure 13B:
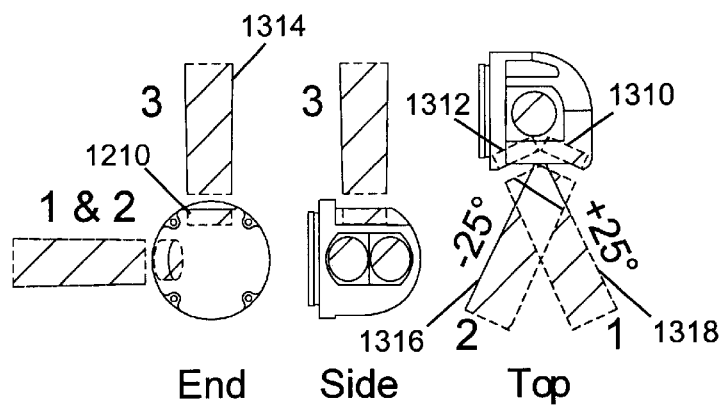
FIG. 13B is a diagram illustrating a sensor section of a sample device in accordance with the claimed invention.

The data stored in storage means 1202 is generated by transducer 1210. Transducer 1210 is an echo location sensor that comprises an acoustic transmitter and receiver. The transmitter transmits an acoustic pulse toward a surface that is to be measured. The receiver listens for an echo returning from the surface. Referring to FIG. 13, transducer 1210 is housed in sensor section 1306, which is illustrated in more detail in the views presented in FIG. 13B. In FIG. 13B, Transducer 1210 is illustrated along with an associated acoustic beam 1314. In the sample implementation illustrated, beam 1314 has an operating range of 0.3 m to 10 m, and the echo is sampled sufficiently rapidly to enable resolving water level with 3 mm accuracy. Additionally, beam 1314 operates at 2 MHz and has a 1.7° beam width.

In addition to transducer 1210, sensor section 1306 includes echo sensors 1310 and 1312, which are shown with associated acoustic beams 1316 and 1318 respectively. Sensor 1310 and 1312 are used for measuring water velocity. Echo sensor 1318 is used to measure the distance to the bottom of the channel or body of water under investigation. Data from all three sensors can be taken simultaneously and stored in storage device 1202.

Processor 1206 controls the operation of device 1300. In particular, processor 1206 controls the operation of I/O interface 1204 and also runs the firmware stored in storage device 1202. By running the firmware, processor 1206 can control the taking of measurements by sensors 1210, 1310, and 1312 and process the data collected by each sensor. Data collected from transducer 1210 is processed by processor 1206, in order to determine the time it took for the transmitted beam to make its way to the surface, reflect, and return where it could be sensed by the receiver in transducer

1210. The time is further processed by converting it to a distance, which is accomplished by multiplying the time by the speed of sound in water. Processor 1206 then converts this distance to a surface level for the body of water being investigated. The data can then be stored for a desired period of time, as illustrated by the graph in FIG. 14A.

Figure 14A:
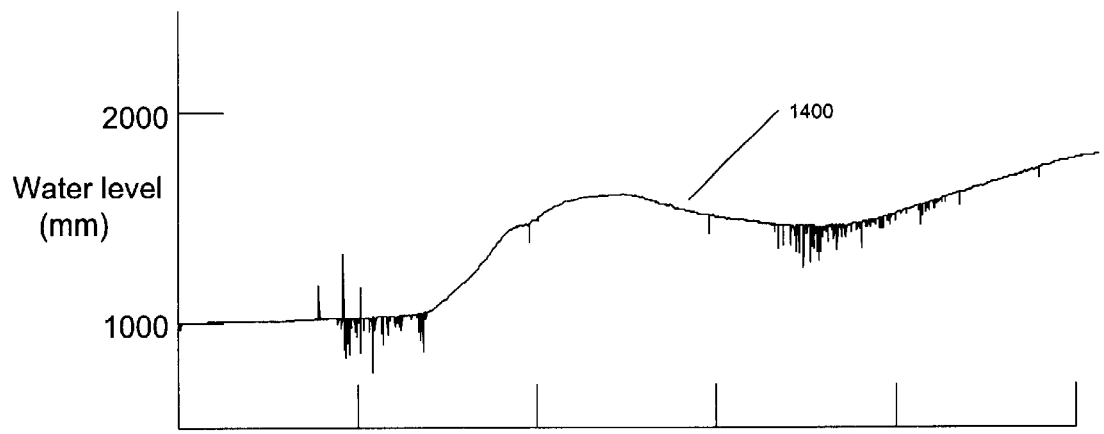
FIG. 14A is a diagram illustrating data collected by a sample device in accordance with the claimed invention.
Figure 14B:
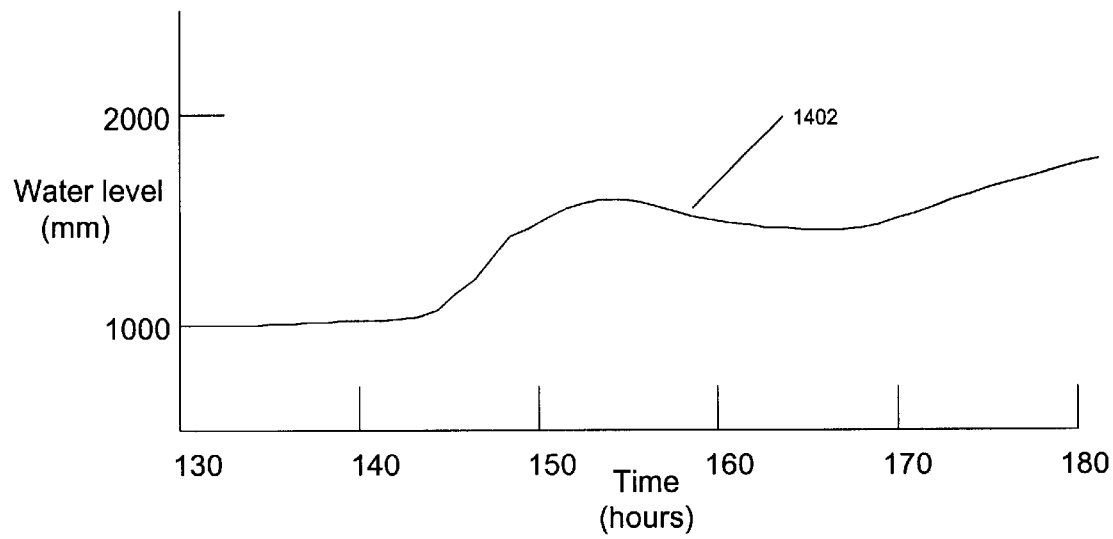
FIG. 14B is a diagram illustrating the improvement in the accuracy of the data collected by a sample device in accordance with the claimed invention.

In FIG. 14A, the data is displayed as a running log 1400 of the surface level in millimeters for the specified time period. The data can be uploaded along with the flow velocity so important characteristics about the flow can be determined. Additionally, processor 1206 can average the stage measurements of transducer 1210 over a variable interval in time. In this way, variations due to waves on the surface of the water can be eliminated and more accurate data can be reported. To further enhance the accuracy of the stage measurement, pressure sensor 1212 is included in device 1300. For example, FIG. 14B illustrates the improvement in log 1402 that can be gained by using pressure sensor 1212. Pressure sensor 1212 is also housed within sensor section 1306 and is used to take a rough, independent measurement of the surface level. The independent measurement is then used in the analysis of the data received by transducer 1210, to determine and isolate the echo that corresponds to the water surface.

Finally, power supply 1208 comprises the electronics that interface to and condition the batteries used to run device 1300. In the example illustrated, device 1300 uses 18 AA alkaline battery cells, which provide 50 watt-hours of battery power at 13.5 VDC when new. This provides a data collection capability of 16 weeks at 10-minute intervals. Additionally, power supply 1208 is capable of supplying 1 amp at 12VDC during maximum transmit power for device 1300. Transmit power for device 1300 operates from 0.3–20 W and is adjustable in 6 dB steps. The average transmit power is 500 mW. Other implementations are capable of multiple power source configurations. For example, after reading this specification, it should be apparent to those practiced in the art how the power source for device 1300 can be implemented using different quantities and types of battery cells.

While various embodiments of the present invention have been shown and described above, it should be understood that they have been presented by way of example only, and not limitation. It should be apparent to those of ordinary skill in the art that many other embodiments are possible without departing from the spirit and scope of the invention. Thus, the breadth and scope of the present invention should not be limited by any of the above-described exemplary embodiments, but should be defined only in accordance with the claims and their equivalents.

What is claimed:

1. A method of determining a surface level of a given body using acoustic ranging, the method comprising:

transmitting a pulse of sound in an upward direction within the body;

receiving a plurality of echoes generated by reflections of the transmitted pulse, and for each of the received echoes:

filtering the received echo, processing the received echo into data for analysis and display to a user, determining a round trip time for the received echo, evaluating the processed data for the received echo according to a plurality of measurement criteria, determining a quality measurement for each of the measurement criteria, and combining each of the quality measurements to generate an overall quality value for the received echo; and selecting which of the received echoes is most likely to correspond to an echo from the surface of the body based on the quality values generated for each of the received echoes.

2. The method of claim 1, wherein transmitting a pulse of sound in an upward direction further comprises;

converting an electronic transmit signal into an acoustic pulse; and transmitting the acoustic pulse toward the surface of the body.

3. The method of claim 1, further comprising converting the received echoes into electronic receive signals.

4. The method of claim 1, further comprising, for each of the received echoes:

determining an amplitude for the received echo; and displaying a graph plotting the determined amplitude versus time for tile received echo.

5. The method of claim 1, wherein the plurality of measurement criteria include:

signal strength of the received echo;

signal to noise ratio of the received echo; and width of the received echo.

6. The method of claim 1, wherein evaluating the processed data further comprises analyzing the data associated with a first received echo in relation to the data associated with subsequent received echoes to determine if the subsequent received echoes are multiple bounce echoes of the first received echo.

7. The method of claim 6, further comprising adding weight to the quality value of the first received echo relative to the quality values of the subsequent received echoes if the first received echo is determined to be an original echo and the subsequent received echoes are determined to be multiple bounce echoes of the first received echo.

8. The method of claim 1, wherein evaluating the processed data further comprises:

taking an independent measurement of the surface height of the body using an independent input device;

evaluating the received echo based on how closely it corresponds to the independent measurement; and weighting the quality value of the received echo based on how closely it correlates with the independent measurement.

9. The method of claim 8, wherein the independent input device is a pressure sensor, and wherein taking an independent measurement of the surface height of the body further comprises combining at least two of a mean pressure, a varying pressure, a time derivative of the varying pressure, a vertical velocity, and a time derivative of the vertical velocity.

10. The method of claim 1, further comprising:

developing historical data;

comparing the processed data associated with each of the received echoes to the historical data; and weighting the quality values for each of the received echoes based on the comparisons with the historical data.

11. The method of claim 10, wherein developing the historical data comprises:

using an amplitude threshold;

building an historical distribution of previously received echoes that cross the threshold;

weighing the threshold more heavily toward recent history, and wherein weighting the quality values for each of the received echoes comprises weighing the corresponding quality value more heavily when a received echo falls within a high distribution region of the historical distribution.

12. The method of claim 11, further comprising:

converting the round trip time associated with the received echo selected as the most likely to correspond to the surface into a depth measurement for the body;

tracking the difference between an independent measurement of the surface height of the body and the depth measurement; and including the tracked difference in the historical distribution information.

13. The method of claim 1, further comprising:

weighting the quality values determined for each of the received echoes; and taking an average of the weighted quality values, wherein the weighting is a function of the quality values.

14. The method of claim 1, further comprising weighting the quality measurements before combining them into the overall quality value.

15. The method of claim 1, further comprising converting the corresponding round trip time for the selected received echo into a distance representing the depth of the body.

16. The method of claim 13, further comprising excluding quality values that fall below a predetermined quality threshold from the average of weighted quality values.

17. A device for determining a surface level of a given body using acoustic ranging, the device comprising:

a transmitter for transmitting acoustic pulses;

a receiver for receiving echoes generated from the transmitted acoustic pulses; and a processor;

the device configured to:

filter the received echoes, process the received echoes into data for analysis and display to a user, determine a round trip time for the received echoes, evaluate the processed data for the received echoes according to a plurality of measurement criteria, determine a quality measurement for each of the measurement criteria for each of the received echoes, and combine each of the quality measurements to generate an overall quality value for each of the received echoes; and select which of the received echoes is most likely to correspond to an echo from the surface of the body based on the overall quality values generated for each of the received echoes.

18. The device of claim 17, further configured to weight the quality measurements before combining them into the overall quality value.

19. The device of claim 17, further configured to convert the corresponding round trip time for the selected received echo into a distance representing the depth of the body.

20. The device of claim 17, further configured to:

determine an amplitude for the received echoes; and display a graph plotting the determined amplitudes versus time for the received echoes.

21. The device of claim 17, wherein the plurality of measurement criteria include:

signal strength of the received echoes;

signal to noise ratio of the received echoes; and width of the received echoes.

22. The device of claim 17, wherein evaluating the processed data further comprises analyzing the data associated with a first received echo in relation to the data associated with subsequent received echoes to determine if the subsequent received echoes are multiple bounce echoes of the first received echo.

23. The device of claim 22, further configured to add weight to the quality value of the first received echo relative to the quality values of the subsequent received echoes if the first received echo is determined to be an original echo and the subsequent received echoes arc determined to be multiple bounce echoes of the first received echo.

24. The device of claim 17, further comprising an independent input device configured to take an independent measurement of the surface height of the body, and wherein the device is further configured to evaluate each of the received echoes based on how closely they correspond to the independent measurement and weight the quality values of the received echoes based on how closely they correlate with the independent measurement.

25. The device of claim 24, wherein the independent input device is a pressure sensor, and wherein taking an independent measurement of the surface level of the body further comprises combining at least two of a mean pressure, a varying pressure, a time derivative of the varying pressure, a vertical velocity, and a time derivative of the vertical velocity.

26. The device of claim 17, further configured to:

develop historical data;

compare the processed data associated with each of the received echoes to the historical data; and weight the quality values for each of the received echoes based on the comparisons with the historical data.

27. The method of claim 26, wherein developing the historical data comprises:

using an amplitude threshold;

building an historical distribution of previously received echoes that cross the threshold;

weighing the threshold more heavily toward recent history, and wherein weighting the quality values for each of the received echoes comprises weighing the corresponding quality value more heavily when a received echo falls within a high distribution region of the historical distribution.

28. The device of claim 27, further configured to:

convert the round trip time associated with the received echo selected as the most likely to correspond to the surface into a depth measurement for the body;

track the difference between an independent measurement of the surface level of the body and the depth measurement; and include the tracked difference in the historical distribution information.

29. The device of claim 17, further configured to:

weight the quality values determined for each of the received echoes; and take an average the weighted quality values, wherein the weighting is a function of the quality values.

30. The method of claim 29, further configured to exclude quality values that fall below a predetermined quality threshold from the average of weighted quality values.

* * * * *